United States Patent [19]

Buyan et al.

[11] 4,446,107

[45] May 1, 1984

[54] IMPROVED FCC VESSEL AND CYCLONE APPARATUS

[75] Inventors: Frank M. Buyan, Yardley, Pa.; James H. Haddad, Princeton Junction, N.J.

[73] Assignee: Mobil Oil Corporation, New York, N.Y.

[21] Appl. No.: 382,334

[22] Filed: May 26, 1982

[51] Int. Cl.³ .................. B01J 8/26; C10G 13/18; B01D 45/12

[52] U.S. Cl. ......................... 422/107; 55/432; 55/459 R; 422/114; 422/147

[58] Field of Search ............. 55/432, 459 R; 137/545, 137/546; 209/258, 495; 422/147

[56] References Cited

U.S. PATENT DOCUMENTS

| 2,698,224 | 12/1954 | Brooke | 422/147 |
|---|---|---|---|
| 2,760,595 | 8/1956 | Pynor | 55/432 |
| 3,489,111 | 1/1970 | Montgomery | 55/432 |
| 3,661,799 | 5/1972 | Cartmell | 252/417 |
| 4,043,899 | 8/1977 | Anderson et al. | 208/161 |
| 4,118,338 | 10/1978 | Gross et al. | 252/417 |
| 4,220,623 | 9/1980 | Jahnke et al. | 422/147 |
| 4,273,565 | 6/1981 | Worley | 422/147 |

FOREIGN PATENT DOCUMENTS

| 2055900 | 5/1972 | Fed. Rep. of Germany | 55/432 |
|---|---|---|---|
| 56-28635 | 3/1981 | Japan | 422/147 |

OTHER PUBLICATIONS

F. A. Zenz, "Cyclone Collectors", Particulate Solids Research, Inc., SA-24, Jul. 1, 1981, pp. 2-82 to 2-94.
Zenz et al., "Particle Carry-Over from Fluidized Beds", Fluidization and Fluid-Particle Systems, Rheinhold Publishing Corporation, pp. 410-415, 1960.

Primary Examiner—David L. Lacey
Attorney, Agent, or Firm—Alexander J. McKillop; Michael G. Gilman; Stanislaus Aksman

[57] ABSTRACT

A fluid catalytic cracking vessel having cyclone separators which have cyclone diplegs. The diplegs have valve plates which are inclined, in the closed position, at an angle of about 30° to about 60° with respect to the vertical axis of the respective diplegs.

9 Claims, 7 Drawing Figures

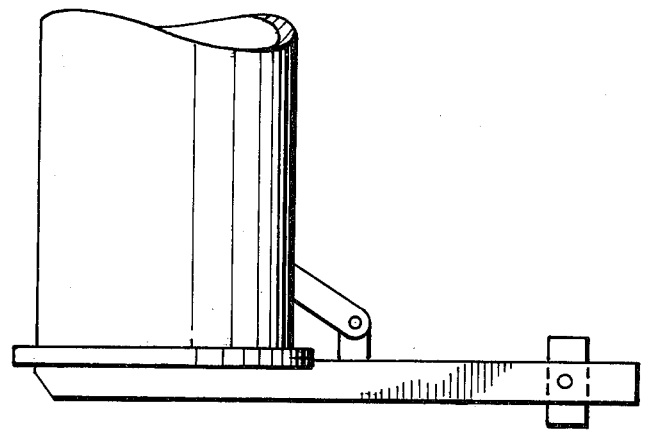
FIG. 1 PRIOR ART VALVE
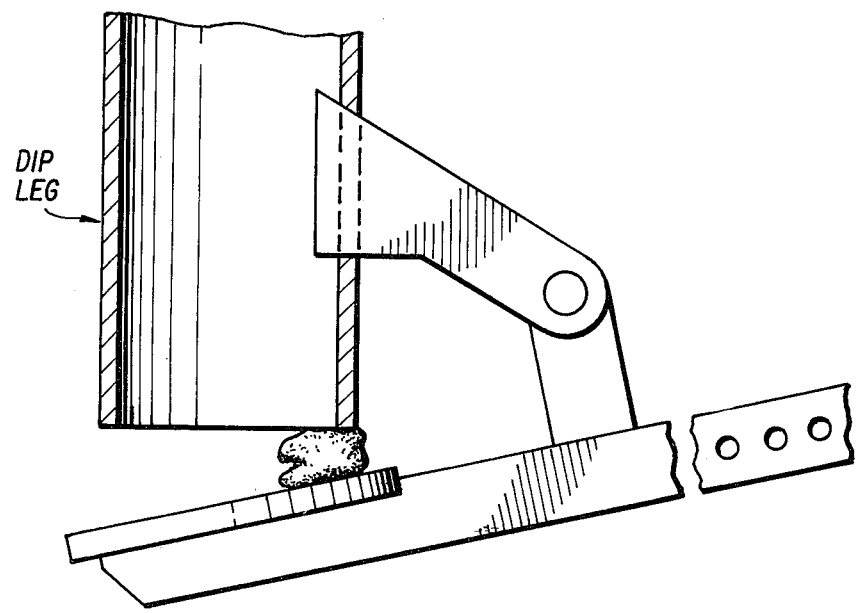
FIG. 1A JAMMED PRIOR ART FLAPPER VALVE

IMPROVED FCC VESSEL AND CYCLONE APPARATUS

BACKGROUND OF THE INVENTION

1. Field of the Invention

This invention is concerned with improving the operation of cyclone separators used to separate finely divided fluidizable catalyst particles from gasiform reaction products. More particularly, the invention is concerned with the method and means for improving the operability and dependability of cyclonic separation equipment commonly used in chemical operations, e.g., in fluid catalytic cracking (FCC) processes.

2. Description of the Prior Art

In the cyclone type of separator, a suspension comprising a gasiform material with entrained finely divided solid material is introduced into the separator in a tangential manner that imparts a spiral or centrifugal swirling motion or action to the suspension. The centrifugal action causes the solids to be thrown to the outer wall of the cyclone separator, and they then slide down the cyclone wall into a solids dust hopper therebelow for withdrawal therefrom, e.g., by a standpipe or dipleg means. The gasiform material thus separated from the solids is removed by a central open passageway extending from a plane beneath the suspension tangential inlet upwardly through the top of the cyclone separator.

The cyclones are particularly useful in connection with organic reactions employing fluidizable catalyst particles, such as in the catalytic treatment of petroleum fractions by cracking, the synthesis of hydrocarbons from carbon monoxide and hydrogen, the conversion of methanol to liquid hydrocarbons or other fluid catalyst operations known in the art.

In modern operations, such as riser catalytic cracking operations, enormous amounts of solid catalyst particles suspended in gasiform materials are handled in riser catalytic cracking units and it is necessary to rapidly separate the suspensions into a catalyst phase and a gasiform phase after the suspension from the conversion operation has traversed the riser unit or conversion zone.

The dipleg or standpipe means of the cyclone is usually equipped with a valve means which allows the accumulated solid catalyst particles to be discharged into the space below the dipleg into the containing vessel once the weight of the accumulated particles in the dipleg reaches a predetermined limit. The valve means may sometimes be equipped with a counterweight to regulate the weight of the solid particles necessary to open the valve means. The most common types of valves used for that purpose are trickle valves, flapper valves and flapper valves with a counterweight, the weight of which may be adjusted for a particular application. A typical flapper valve equipped with a counterweight is illustrated in FIG. 1. Other trickle and flapper valves, with and without counterweights, are shown and discussed in Zenz and Othmer, "Fluidization and Fluid Particles Systems", Rheinhold Publishing Corporation, 1960, pages 410–415, and in the article by F. A. Zenz, "Cyclone Collectors," a Particulate Solids Research, Inc. publication, State of the Art-24, July 1, 1981, pages 2-82 through 2-94, the entire contents of both being incorporated herein by reference.

The flapper valve positioned perpendicularly to the standpipe (shown in FIG. 1) is a commonly used valve in FCC installations, both in the reactor vessels and in the regenerator vessels. The flapper valve is usually equipped with a counterweight, as discussed above.

Modern designs for reactor and regenerator vessels of the FCC installations incorporate a dense and dilute fluidized phases. For example, in the regenerator vessel of the fast fluidized bed regenerator (described, e.g., by Gross et al. in U.S. Pat. No. 4,118,338, the entire contents of which are incorporated herein by reference) the inner bed of spent catalyst comprises a primarily dilute fast fluidized phase in the lower regenerator vessel, while the outer bed of regenerated catalyst is a dense fluidized phase. Final separation of the flue gas from catalyst takes place in cyclones usually arranged in several sets of two in series, located in a second dilute phase in the upper regenerator, and above the dense bed. The two cyclone stages in series are usually referred to as primary and secondary cyclones. Both sets of cyclones have diplegs which usually terminate in the second dilute phase, returning catalyst particles therefrom by free-fall to the dense bed below. The flapper valves placed perpendicular against the bottoms of the diplegs and equipped with the counterweights properly serve their function in the second dilute phase. A substantial volume of catalyst is usually conducted through the diplegs from the primary cyclones. The relatively large flow rate of the catalyst prevents any solid particles (e.g., coke or a piece of refactory) from being wedged between the valve plate and the end of the dipleg.

However, in the diplegs of the secondary cyclones, where the flow rate of the catalyst is substantially lower than in the primary cyclone diplegs, solid particles are often lodged between the horizontal plate of the valve and the bottom of the dipleg, thereby jamming the valve in the opened position, as illustrated in FIG. 1A. The jammed valve allows process gases to travel up through the dipleg and out of the cyclone, carrying with them small fine particles of catalyst. In the regenerator vessel, the catalyst-containing gas carries the solid catalyst particles out through the stack and into the atmosphere. The increased particulate content of the stack gas may violate environmental regulations. In the reactor vessel, the catalyst-containing gas may carry the solid catalyst particles into the main fractionation column, thereby fouling it and disrupting the operation of the column and of other downstream equipment.

Accordingly, it is a primary object of the present invention to provide an improved flapper valve means for cyclone diplegs.

It is an additional object of the present invention to provide a flapper valve for cyclone diplegs which prevents or substantially eliminates the risk of solid particles lodging in-between the plate of the valve and the outlet of the dipleg.

Additional objects of the invention will become apparent to those skilled in the art from the specification and the appended claims.

BRIEF DESCRIPTION OF THE INVENTION

A dipleg of the cyclone separating means of the present invention is equipped with a valve means which is inclined at an angle of about 30° to about 60° with respect to the vertical axis of the dipleg when the valve is closed. In a preferred embodiment, the exit end of the dipleg is cut or terminated at an angle of about 30° to about 60° with respect to the vertical axis thereof. In an alternative embodiment, the terminal foot or less of the length of the dipleg is bent (inclined) at an angle of about 30° to about 60° with respect to the vertical axis of the dipleg.

BRIEF DESCRIPTION OF THE FIGURES

FIG. 1 is a schematic representation of the exit end of the cyclone dipleg equipped with a valve of the prior art.

FIG. 1A is a schematic representation of the jammed prior art valve.

DETAILED DESCRIPTION OF THE INVENTION

The plate of the valve is inclined at an angle of about 30+ to about 60°, preferably about 40° to about 55°, with respect to the vertical axis of the dipleg when the valve is in the closed position. In a preferred embodiment (FIGS. 3 and 4), the dipleg is a substantially straight elongated conduit having the terminal end thereof cut at the same angle as the angle of inclination of the plate of the valve, i.e., about 30° to about 60°, preferably about 40° to about 55°.

In an alternative embodiment (FIGS. 3A and 5), almost the entire length of the dipleg is a substantially straight elongated conduit, except for the terminal portion thereof which is bent or inclined at the angle of inclination of the plate of the valve in the closed position. The terminal portion comprises about the lower foot or less of the length of the dipleg, at the end of which the solids exit the dipleg. That terminal portion is graphically illustrated in FIG. 5 and it is designated by a letter "T". In either embodiment, the valve may be equipped with a counterweight, e.g., as shown in FIGS. 3, 3A, 4 and 5.

The invention will now be described in conjunction with two specific embodiments thereof illustrated in FIGS. 3, 3A, 4 and 5. However, as will be apparent to those skilled in the art, the embodiments of these Figures are only two examples of the utilization of this invention, the scope of which is not limited thereby, except as set forth in the appended claims.

Figure 2:
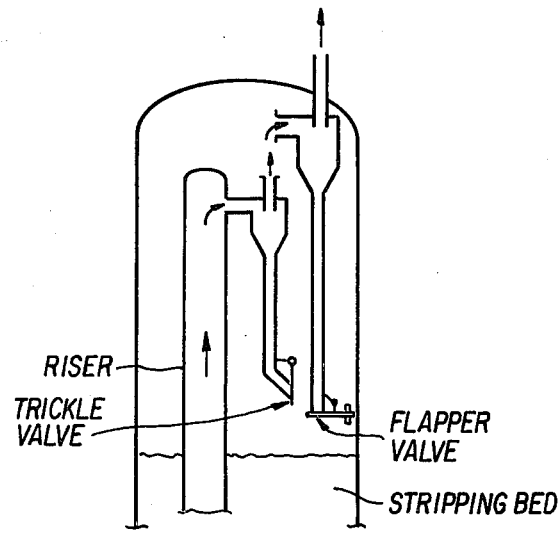
FIG. 2 is a schematic representation of a typical installation containing a valve of the prior art of the cyclone in the FCC riser reactor.
Figure 3:
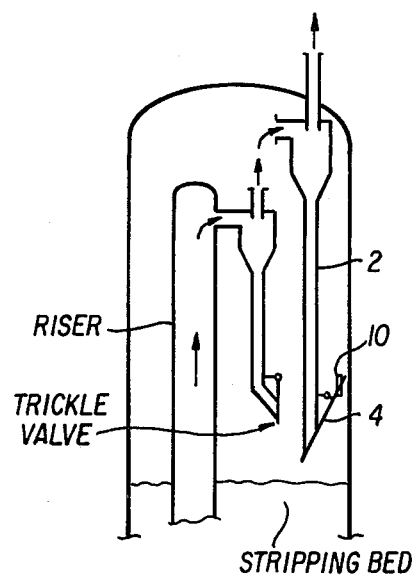
FIG. 3 is a schematic representation of an FCC reactor containing a cyclone equipped with a valve of one embodiment of the present invention.
Figure 4:
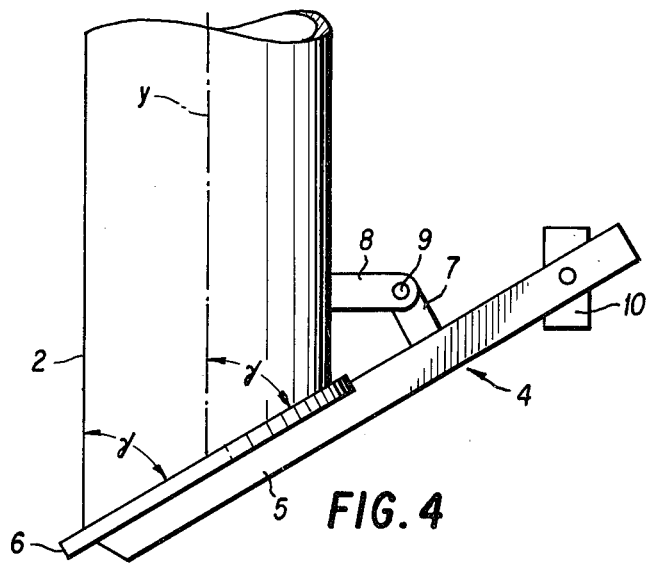
FIG. 4 is a detailed illustration of the valve of one embodiment of the present invention, schematically shown in FIG. 3.

With reference to FIGS. 3 and 4, a standpipe 2 (the entire length of which is shown in FIG. 3, but only the terminal exit end thereof is shown in FIG. 4) is terminated or cut at its exit at an angle $\alpha$. The angle $\alpha$ is about 30° to about 60°, preferably about 40° to about 55°, as discussed above. In the embodiment of FIGS. 3 and 4, the angle $\alpha$ is 60°. The exit of the standpipe is equipped with a flapper valve 4, comprising a plate 6, attached to a support element 5, which is attached to an arm 7. The arm 7 is pivoted, at the pivot point 9, to an arm 8, attached to the dipleg 2. The support element 5 has attached thereto a counterweight 10, at the distal end opposite to the end having the plate 6 attached thereto. The counterweight serves the same function as it does in conventional valves, e.g., as that shown in FIG. 1. As shown in FIG. 4, in the closed position, the plate 6 is inclined with respect to the vertical axis y (shown in a phantom line) of the standpipe at the same angle $\alpha$ as the exit end of the standpipe is cut to provide a tight seal. The downward pressure of the counterweight 10 maintains the plate 6 in the closed position for as long as the weight of the accumulated solids in the standpipe is less than the weight of the counterweight 10. Once the weight of the solids in the standpipe exceeds the weight of the counterweight 10, plus the force exerted on plate 6 due to any pressure differential between the pressure in the dipleg and the pressure in the space surrounding the valve, the plate 6 swings open and allows the solids to exit. The sloping surface of the plate 6 prevents the solid particles from being wedged between the plate 6 and the exit end of the standpipe 2, as can happen with the standpipe flapper valves of the prior art (see FIG. 1A). After a substantial amount of the solid particles exits the standpipe, and the weight of the solids exerting pressure on the plate 6 is less than the weight of the counterweight 10, the plate 6 moves upwardly to the closed position shown in FIG. 4.

Figure 3A:
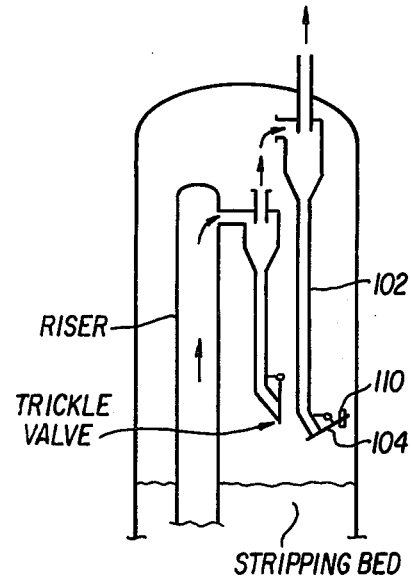
FIG. 3A is a schematic representation of an FCC reactor containing a cyclone equipped with a valve of an alternative embodiment of the present invention.
Figure 5:
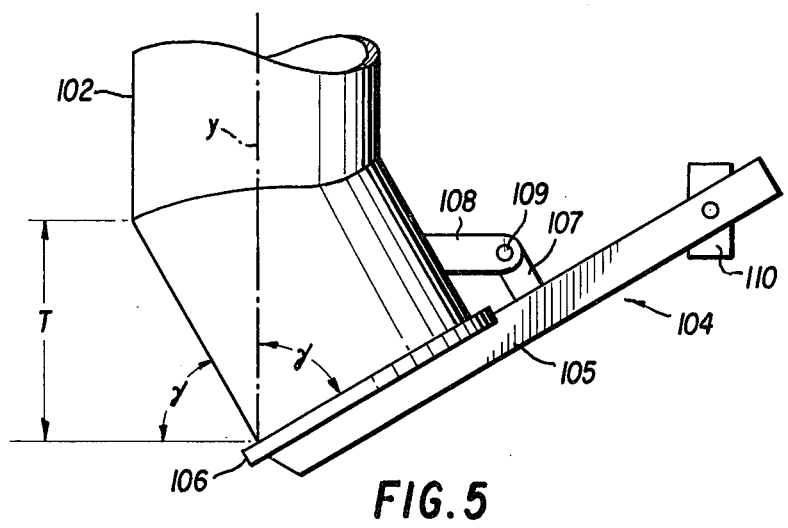
FIG. 5 is a detailed illustration of the valve of the alternative embodiment of the present invention schematically shown in FIG. 3A.

An alternative embodiment of the invention is shown in FIGS. 3A and 5. In this embodiment, the respective parts of the apparatus are designated by the same numerals as the apparatus of FIGS. 3 and 4, but they are preceded by a prefix 100. Thus, for example, the standpipe 2 of FIGS. 3 and 4 corresponds to the standpipe 102 of FIGS. 3A and 5. Accordingly, it is believed that the operation of the apparatus of FIGS. 3A and 5 will be apparent to those skilled in the art from the above description of the apparatus of FIGS. 3 and 4. Only the modifications of the apparatus of FIGS. 3A and 5, as compared to that of FIGS. 3 and 4, are discussed below.

In the embodiment of FIGS. 3A and 5, the terminal end of the standpipe 102, designated by letter T and comprising the last foot or less of the length of the standpipe (the length being measured from the point of entrance of the solid particles to the point of exit thereof), is bent at an angle $\alpha$, with respect to the vertical axis y of the straight portion of the standpipe. Accordingly, the point and the manner of attachment of the arm 108 supporting the valve assembly 104 is modified to provide a tight seal between the exit of the standpipe 102 and the plate 106. Accordingly, the plate 106, in the closed position, is positioned at an angle $\alpha$ with respect to the vertical axis y (also shown in a phantom line in FIG. 4) of the straight portion of the standpipe 102. In the embodiment of FIGS. 3A and 5, the angle $\alpha$ is 60°. It will be apparent to those skilled in the art that the materials of construction and the dimensions of the component parts of the valve, and the weight of the counterweight 110, can be chosen and designed in accordance with the requirements of a particular installation in a conventional manner.

As briefly mentioned above, the modifier valve of the present invention is particularly useful in those applications where it is desired to separate solid particles from a relatively thinly dispersed solids-in-gas mixture, and where the dipleg terminates in a dilute phase. However, it will be apparent to those skilled in the art that the valve of this invention may be utilized in any applications requiring an efficient and thorough separation of solids from the dispersion thereof in a gaseous stream with minimum leakage of gas through the valve. The design of the valve prevents and usually substantially eliminates the danger of the valve being jammed open by a solid particle. Thus, the danger of a gas leaking past the valve, in a direction countercurrent to the downward flow of catalyst, is also substantially eliminated. Trickle valves, also employed to seal diplegs which terminate in dilute phases, have become wedged in the open position by solid particles lodged between the plate and the bottom of the dipleg. Replacement of the trickle valves with the valve of this invention will prevent or substantially eliminate the risk of particles being so lodged.

It will be apparent to those skilled in the art that the specific embodiments discussed above can be successfully repeated with components equivalent to those generically or specifically set forth above and under variable process conditions.

From the foregoing specification one skilled in the art can readily ascertain the essential features of this invention and without departing from the spirit and scope thereof can adopt it to various diverse applications.

We claim:

1. In a fluid catalytic cracking vessel containing a cyclone means for separating solids from a solids-gas mixture, said cyclone means comprising a conduit means in open communication with said vessel, said conduit means conducting separated gases from the cyclone means to the outside thereof, a dipleg means in open communication with said vessel, said dipleg means conducting separated solids into the vessel, and a valve means at the exit end of said dipleg means, said valve means comprising a plate closing said exit of said dipleg means, the improvement wherein the plate of said valve means is inclined in the closed position at an angle of about 30° to about 60° with respect to the vertical axis of said dipleg means to substantially prevent solid materials from being wedged between said plate and the exit end of said dipleg means.

2. A vessel of claim 1 wherein said exit end of said dipleg means is terminated at an angle of about 30° to about 60° with respect to the vertical axis of said dipleg means.

3. A vessel of claim 2 wherein said valve means additionally comprises a counterweight attached to said plate at the end opposite to that at which said plate seals the exit end of the dipleg means.

4. A vessel of claim 3 wherein said exit end of said dipleg means is terminated at an angle of about 40° to about 55° with respect to the vertical axis of said dipleg means.

5. A vessel of claim 3 wherein said exit end of said dipleg means is terminated at an angle of 60° degrees.

6. A vessel of claim 1 wherein the terminal foot or less of the length of said dipleg means is inclined at an angle of about 30° to about 60° with respect to the vertical axis of said dipleg means.

7. A vessel of claim 6 wherein said valve means additionally comprises a counterweight attached to said plate at the end opposite to that at which said plate seals said exit end of said dipleg means.

8. A vessel of claim 6 wherein the terminal foot or less of the length of said dipleg means is inclined at an angle of about 40° to about 55° with respect to the vertical axis of said dipleg means.

9. A vessel of claim 7 wherein the terminal foot or less of the length of said dipleg means is inclined at an angle of 60 degrees with respect to the vertical axis of said dipleg means.

* * * * *

UNITED STATES PATENT AND TRADEMARK OFFICE
CERTIFICATE OF CORRECTION

PATENT NO. : 4,446,107

DATED : May 1, 1984

INVENTOR(S) : F.M. BUYAN and J.H. HADDAD

It is certified that error appears in the above-identified patent and that said Letters Patent is hereby corrected as shown below:

Column 2, line 27: "refactory" should be --refractory--.

Column 3, line 30: "30+" to --30°--.

Signed and Sealed this

Ninth Day of April 1985

[SEAL]

Attest:

DONALD J. QUIGG

Attesting Officer     Acting Commissioner of Patents and Trademarks